United States Patent
Lavoie et al.

(10) Patent No.: US 7,360,471 B2
(45) Date of Patent: Apr. 22, 2008

(54) TRIPLE OUTPUT TRANSFER CASE FOR A VEHICLE SEAT

(75) Inventors: Scott Lavoie, Red Oak, IA (US); Brent Frazier, Bellview, NE (US)

(73) Assignee: Intier Automotive Inc., Aurora, Ontario (CA)

( * ) Notice: Subject to any disclaimer, the term of this patent is extended or adjusted under 35 U.S.C. 154(b) by 1198 days.

(21) Appl. No.: 10/380,184

(22) PCT Filed: Sep. 7, 2001

(86) PCT No.: PCT/US01/27649

§ 371 (c)(1), (2), (4) Date: Jul. 7, 2003

(87) PCT Pub. No.: WO02/20302

PCT Pub. Date: Mar. 14, 2002

(65) Prior Publication Data

US 2008/0041187 A1  Feb. 21, 2008

(51) Int. Cl.
*F16H 37/06* (2006.01)

(52) U.S. Cl. .................. 74/724; 74/664; 74/665 A; 74/665 C; 74/665 F; 74/665 M; 74/665 P; 192/48.2; 192/84.92; 297/344.13; 297/344.14

(58) Field of Classification Search .............. 74/724, 74/664, 665 A, 665 C, 665 F, 665 M, 665 P; 192/48.2, 48.8, 48.9, 69.8, 69.82, 84.92
See application file for complete search history.

(56) References Cited

U.S. PATENT DOCUMENTS 2,930,428 A  3/1960  Rose
3,437,303 A  4/1969  Pickles
4,299,316 A  11/1981  Reinmoeller (Continued)

FOREIGN PATENT DOCUMENTS

DE  43 18 481 A1  6/1993

(Continued)

*Primary Examiner*—David D. Le
(74) *Attorney, Agent, or Firm*—Clark Hill PLC

(57) ABSTRACT

A transfer case assembly (10) for selectively moving a seat assembly in a plurality of adjustment directions. The assembly comprises a motor (12) and a drive shaft (14) operatively connected to the motor (12) for rotation in response to actuation of the motor. A plurality of driving gears (16, 18, 20) are mounted to the drive shaft for rotation therewith. A plurality of driven (24, 28, 32) shafts corresponding with the respective plurality of driving gears are provided for independently controlling movement of the seat assembly in the fore/aft, up and down direction. A driven gear is rotatably mounted to each of the driven shafts and meshed with a respective one of the driving gears for rotation therewith. A coupler (22, 26, 30) is disposed adjacent to each of the driven gears for selectively coupling the driven gears to the respective driven shafts (24, 28, 32). A solenoid (38, 52, 66) is disposed adjacent to each of the couplers (22, 26, 30) for operative engagement therewith for selectively coupling the driven gears with the respective driven shafts to transfer rotation of the drive shaft to rotation of the driven shafts through independent or simultaneous actuation of the solenoids and the motor whereby the seat assembly may be moved in one or more of the plurality of adjustment directions.

23 Claims, 4 Drawing Sheets

U.S. PATENT DOCUMENTS

| | | |
|---|---|---|
| 4,773,704 A | 9/1988 | Engels |
| 4,966,045 A | 10/1990 | Harney |
| 5,092,197 A | 3/1992 | Hauger |
| 5,127,286 A | 7/1992 | Wittig |
| 5,163,734 A | 11/1992 | Hakansson |
| 5,419,219 A | 5/1995 | Takizawa |
| 5,470,129 A | 11/1995 | Ferrero |
| 5,483,853 A | 1/1996 | Moradell et al. |
| 5,528,959 A | 6/1996 | Yamakami |
| 5,575,531 A | 11/1996 | Gauger et al. |
| 5,709,363 A | 1/1998 | Matsuhashi |
| 5,762,309 A * | 6/1998 | Zhou et al. .................. 248/429 |
| 5,765,840 A | 6/1998 | Tame |
| 6,055,877 A | 5/2000 | Welterlin et al. |
| 6,158,811 A | 12/2000 | Hofschulte et al. |
| 6,626,064 B1 * | 9/2003 | Maue et al. ............... 74/665 F |

FOREIGN PATENT DOCUMENTS

| | | |
|---|---|---|
| EP | 0 449 688 B1 | 3/1991 |
| EP | 0 904 976 A1 | 9/1998 |
| GB | 2 136 086 A | 2/1983 |

* cited by examiner

TRIPLE OUTPUT TRANSFER CASE FOR A VEHICLE SEAT

BACKGROUND OF THE INVENTION

1. Technical Field

The subject invention relates to a multi-output transfer case for a power automotive seat which utilizes a single motor.

2. Description of the Related Art

Manual and power adjustment mechanisms for automobile seats are common in the automotive industry. The adjustment mechanisms typically allow an operator to raise or lower a front or rear portion of the seat, or move the seat forward and rearward. The adjustment mechanisms usually include separate actuators for raising the front portion of the seat independently of the rear portion. Also, a separate actuator is typically used to move the seat forward and rearward and to move the entire seat up and down. In other words, a separate actuator is typically needed for each axis of movement.

Powered seats typically require at least two motors to raise the front and rear portions independently of each other. A third motor is required to move the seat forward and rearward. These multiple motors increases the complexity and cost of the adjustment mechanism.

SUMMARY OF THE INVENTION

The disadvantages of the prior art may be overcome by providing a multi-output transfer case having a single motor for providing movement of a seat assembly along multiple axes.

According to one aspect of the invention, a transfer case assembly is provided for selectively moving a seat assembly in a plurality of adjustment directions. The assembly comprises a motor and a drive shaft operatively connected to the motor for rotation in response to actuation of the motor. A plurality of driving gears are mounted to the drive shaft for rotation therewith. A plurality of driven shafts corresponding with the respective plurality of driving gears are provided for independently controlling movement of the seat assembly. A driven gear is rotatably mounted to each of the driven shafts and meshed with a respective one of the driving gears for rotation therewith. A coupler is disposed adjacent to each of the driven gears for selectively coupling the driven gears to the respective driven shafts. A power actuator is disposed adjacent to each of the couplers for operative engagement therewith for selectively coupling the driven gears with the respective driven shafts and transfer rotation of the drive shaft to rotation of the driven shafts through independent or simultaneous actuation of the actuators and the motor whereby the seat assembly may be moved in one or more of the plurality of adjustment directions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
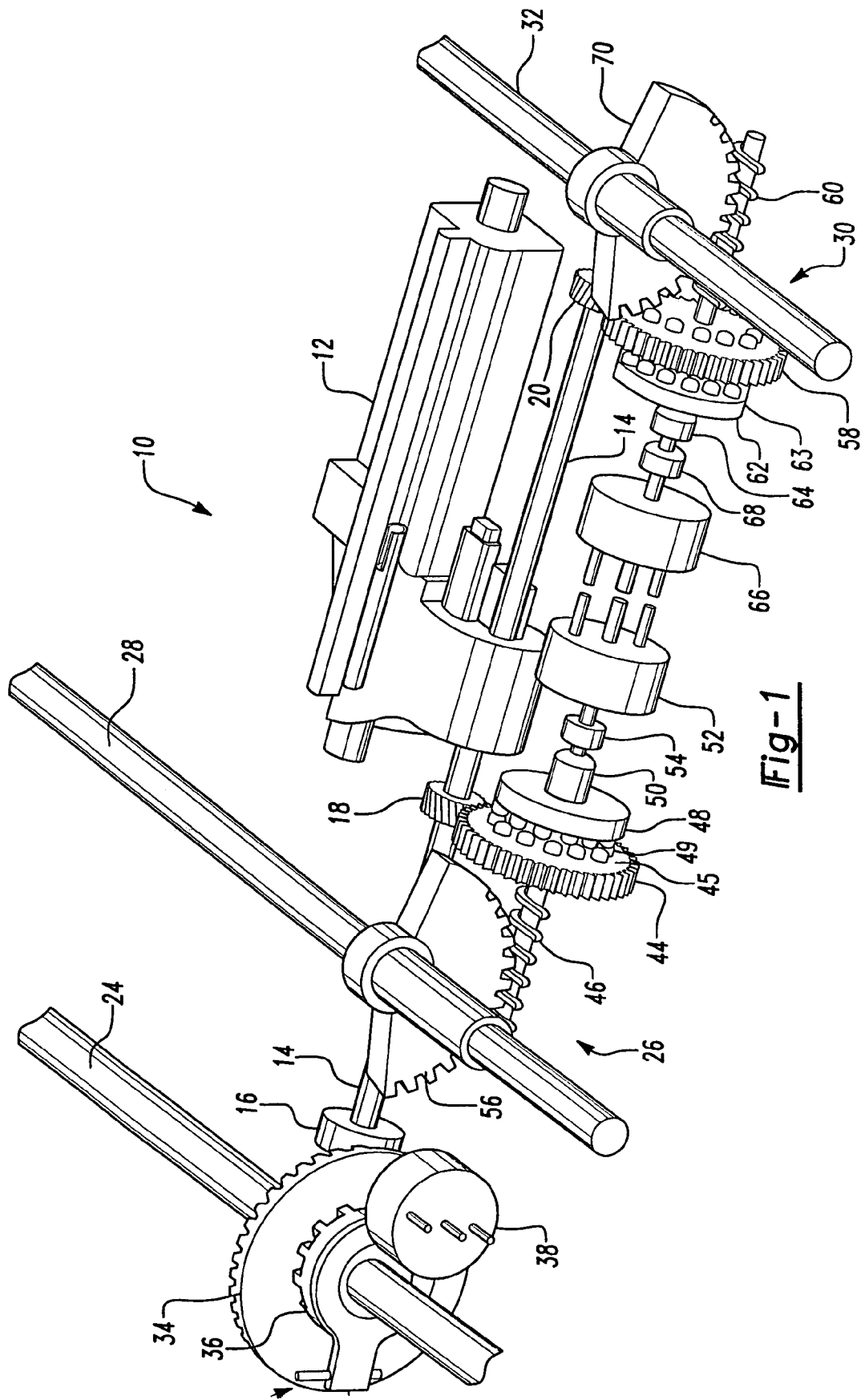
FIG. 1 is a perspective view of a transfer case assembly in accordance with the subject invention.

Referring to the Figures, wherein like numerals indicate alike or corresponding parts throughout the several views, a multi-output transfer case assembly is generally shown at 10 in FIG. 1. The transfer case assembly 10 is designed to move a seat cushion (or seat assembly) up, down, forward and rearward. In particular, the transfer case assembly 10 can independently move a front portion of the seat cushion up and down, independently move a rear portion of the seat cushion up and down, or move the entire seat cushion up, down, forward or rearward. The seat cushion is part of an entire automotive seat assembly which also includes a seat back as is known in the art. The transfer case assembly 10 is uniquely designed to incorporate a single motor 12 for providing, or powering, the up, down, forward and rearward movements for the seat cushion.

A drive shaft 14 is rotatably coupled to the motor 12 such that the motor 12 drives the drive shaft 14. The motor 12 is of any conventional design and couples to the drive shaft 14 in any conventional manner. First 16, second 18 and third 20 driving gears are fixedly mounted to the drive shaft 14 in spaced relationship to each other and rotate with the drive shaft 14. As will be discussed in greater detail below, the first driving gear 16 selectively engages a first coupling 22 to couple the first driving gear 16 to a fore-aft shaft 24 for moving the seat cushion forward and rearward. The second driving gear 18 selectively engages a second coupling 26 to couple the second driving gear 18 to a front vertical lift shaft 28 for moving the front portion of the seat cushion upward and downward. Finally, the third driving gear 20 selectively engages a third coupling 30 to couple the third driving gear 20 to a rear vertical lift shaft 32 for moving the rear portion of the seat cushion upward and downward.

Figure 2:
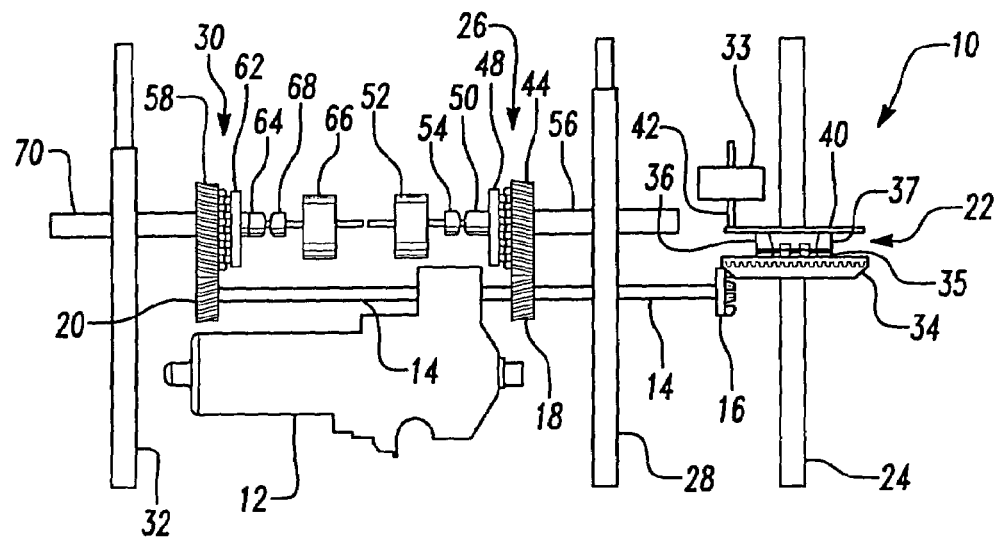
FIG. 2 is a top view of the transfer case assembly.
Figure 3:
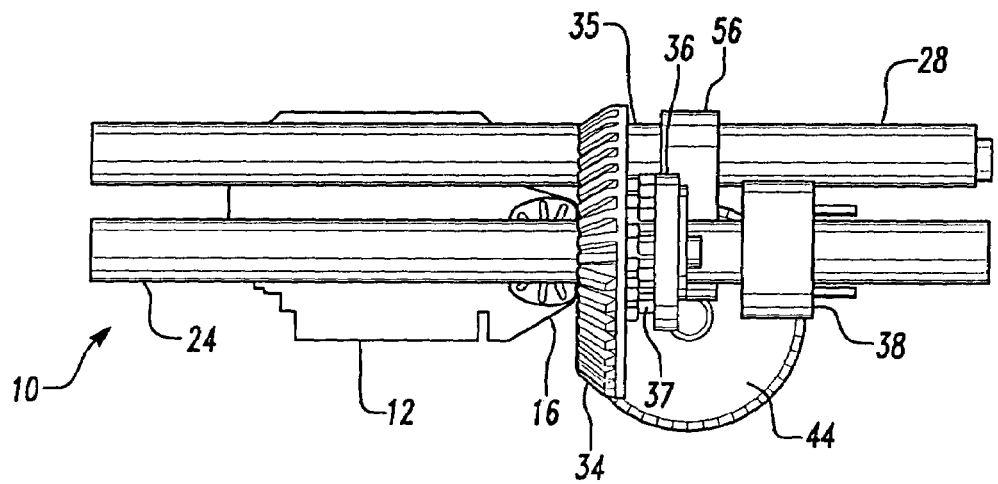
FIG. 3 is a front view of the transfer case assembly.
Figure 4:
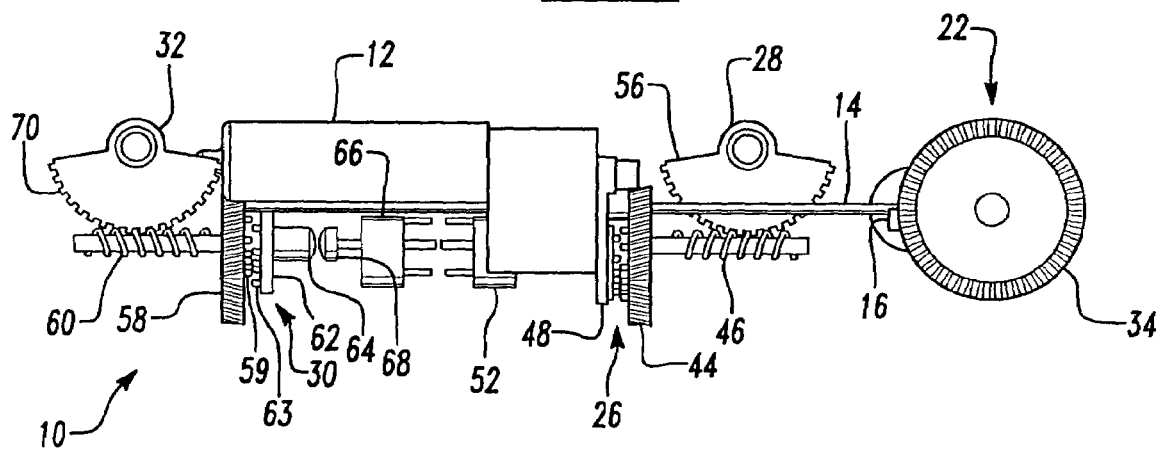
FIG. 4 is a side view of the transfer case assembly.

Referring also to FIGS. 2 through 4, the first 22, second 26 and third 30 couplings are discussed in greater detail. Each of the couplings 22, 26, 30 includes at least a free spinning driven gear, a toothed clutch and a solenoid.

In particular, the first coupling 22 includes a first driven gear 34 which rotates freely about the fore-aft shaft 24. The first driven gear 34 is in constant driving engagement with the first driving gear 16. It should be appreciated that both the first driven gear 34 and the first driving gear 16 have co-acting teeth for transferring rotary motion of the first driving gear 16 to rotary motion of the first driven gear 34. As best shown in FIGS. 2 and 3, a plurality of tabs 35 extend from the first driven gear 34 to selectively engage a first engagement ring 36. The first engagement ring 36 is non-rotatably and slidably mounted to the fore-aft shaft 24 and includes corresponding tabs 37. As will be appreciated, the first engagement ring 36 slides longitudinally along the fore-aft shaft 24 such that the tabs 37 of the first engagement ring 36 can selectively engage the tabs 35 of the first driven gear 34, thereby defining a first toothed clutch. Accordingly, when the first engagement ring 36 engages the first driven gear 34, via the tabs 35, 37, rotation of the first driven gear 34 translates into rotation of the fore-aft shaft 24.

A first solenoid 38 is connected to the first engagement ring 36 and moves the first engagement ring 36 between engaged and disengaged positions. A plate 40 is non-rotatably and slidably mounted to the fore-aft shaft 24 between the first engagement ring 36 and the first solenoid 38. In particular, the fore-aft shaft 24 has a spline, non-circular or otherwise irregular configuration with the plate 40 having a corresponding configuration such that the plate 40 cannot rotate relative to the fore-aft shaft 24. The first solenoid 38 preferably includes a first plunger 42 which moves inward and outward to affect the sliding movement of the plate 40 and first engagement ring 36. A first return spring is disposed about the fore-aft shaft 24 between the first engagement ring 36 and the first driven gear 34 for continuously biasing the first engagement ring 36 to the disengaged position.

The second coupling 26 includes a second driven gear 44 which rotates freely about a front worm drive 46. The second driven gear 44 is in constant driving engagement with the second driving gear 18. It should be appreciated that both the second driven gear 44 and the second driving gear 18 have co-acting teeth for transferring rotary motion of the second driving gear 18 to rotary motion of the second driven gear 44. As best shown in FIG. 4, the front worm drive 46 includes a worm gear section and a shaft section. The second driven gear 44 rotates about the shaft section of the front worm drive 46. The second driven gear 44 is prevented from sliding along the shaft section of the front worm drive 46 by either a stop on the shaft section and/or the gearing between the second driving gear 18 and the second driven gear 44.

A plurality of tabs 45 extend from the second driven gear 44 to selectively engage a second engagement ring 48. The second engagement ring 48 is non-rotatably and slidably mounted to the shaft section of the front worm drive 46 and includes corresponding tabs 49. As will be appreciated, the second engagement ring 48 slides longitudinally along the front worm drive 46 such that the tabs 49 of the second engagement ring 48 can selectively engage the tabs 45 of the second driven gear 44, thereby defining a second toothed clutch. Accordingly, when the second engagement ring 48 engages the second driven gear 44, via the tabs 45, 49, rotation of the second driven gear 44 translates into rotation of the front worm drive 46. An appendage 50, best shown in FIG. 2, extends outwardly from the second engagement ring 48 in an opposite direction of the tabs 49.

Referring to FIGS. 2 and 4, a second solenoid 52 is connected to the second engagement ring 48 and moves the second engagement ring 48 between engaged and disengaged positions. Specifically, the second solenoid 52 includes a second plunger 54 which engages the appendage 50 of the second engagement ring 48. The second plunger 54 moves inward and outward to affect the sliding movement of the second engagement ring 48. The appendage 50 and second plunger 54 are formed and configured to create a virtually frictionless contact between the plunger 54 and ring 48 such that rotation of the second engagement ring 48, and the appendage 50, does not rotate the second plunger 54. A second return spring is disposed about the shaft section of the front worm drive 46 between the second engagement ring 48 and the second driven gear 44 for continuously biasing the second engagement ring 48 to the disengaged position. The non-sliding nature of the second driven gear 44 provides a surface for the second return spring to react against for biasing the second engagement ring 48.

As best shown in FIG. 4, a front fan gear 56 is non-rotatably mounted to the front lift shaft 28 and engages the front worm drive 46. Teeth are disposed on the front fan gear 56 to engage the worm gear section of the front worm drive 46. Accordingly, rotational movement of the front worm drive 46 translates into rotational movement of the front fan gear 56 and the front lift shaft 28. The front fan gear 56 is designed and configured such that the front fan gear 56 may not over rotate the front lift shaft 28 beyond 180°. The configuration of the front fan gear 56 and the front worm drive 46 also creates a self-locking engagement. In other words, any back-driving of the front lift shaft 28 cannot be translated through the front fan gear 56 and front worm drive 46. The self-locking front fan gear 56 and front worm drive 46 enable the transfer case assembly 10 to retain the front portion of the seat cushions in the stated position when the transfer case assembly 10 is not energized.

The third coupling 30 is substantially a mirror image of the second coupling 26. In particular, the third coupling 30 includes a third driven gear 58 which rotates freely about a rear worm drive 60. The third driven gear 58 is in constant driving engagement with the third driving gear 20. It is appreciated that both the third driven gear 58 and the third driving gear 20 have co-acting teeth for transferring rotary motion of the third driving gear 20 to rotary motion of the third driven gear 58. The rear worm drive 60 includes a worm gear section and a shaft section. The third driven gear 58 rotates about the shaft section of the rear worm drive 60. The third driven gear 58 is prevented from sliding along the shaft section of the rear worm drive 60 by either a stop on the shaft section and/or the gearing between the third driving gear 20 and the third driven gear 58.

A plurality of tabs 59 extend from the third driven gear 58 to selectively engage a third engagement ring 62. The third engagement ring 62 is non-rotatably mounted to the shaft section of the rear worm drive 60 and includes corresponding tabs 63. As will be appreciated, the third engagement ring 62 slides longitudinally along the rear worm drive 60 such that the tabs 63 of the third engagement ring 62 can selectively engage the tabs 59 of the third driven gear 58, thereby defining a third toothed clutch. Accordingly, when the third engagement ring 62 engages the third driven gear 58, via the tabs 59, 63, rotation of the third driven gear 58 translates into rotation of the rear worm drive 60. An appendage 64 extends outwardly from the third engagement ring 62 in an opposite direction of the tabs 63.

A third solenoid 66 is connected to the third engagement ring 62 and moves the third engagement ring 62 between engaged and disengaged positions. Specifically, the third solenoid 66 includes a third plunger 68 which engages the appendage 64 of the third engagement ring 62. The third plunger 68 moves inward and outward to affect the sliding movement of the third engagement ring 62. The appendage 64 and third plunger 68 are formed and configured to create a virtually frictionless contact such that rotation of the third engagement ring 62, and the appendage 64, does not rotate the third plunger 68. A third return spring is disposed about the shaft section of the rear worm drive 60 between the third engagement ring 62 and the third driven gear 58 for continuously biasing the third engagement ring 62 to the disengaged position. The non-sliding nature of the third driven gear 58 provides a surface for the third return spring to react against for biasing the third engagement ring 62.

A rear fan gear 70 is non-rotatably mounted to the rear lift shaft 32 and engages the rear worm drive 60. Teeth are disposed on the rear fan gear 70 to engage the worm gear section of the rear worm drive 60. Accordingly, rotational movement of the rear worm drive 60 translates into rotational movement of the rear fan gear 70 and the rear lift shaft 32. The rear fan gear 70 is designed and configured such that the rear fan gear 70 may not over rotate the rear lift shaft 32 beyond 180°. As discussed above with reference to the front fan gear 56, the configuration of the rear fan gear 70 and the rear worm drive 60 creates a self-locking engagement. In other words, any back-driving of the rear lift shaft 32 cannot be translated through the rear fan gear 70 and rear worm drive 60. The self-locking rear fan gear 70 and rear worm drive 60 enable the transfer case assembly 10 to retain the rear portion of the seat cushion in the stated position when the transfer case assembly 10 is not energized.

Plastic covers are preferably disposed over each of the parts of the transfer case assembly 10. These plastic covers serve to both protect the components from contaminants and act as a safety guard.

Figure 5:
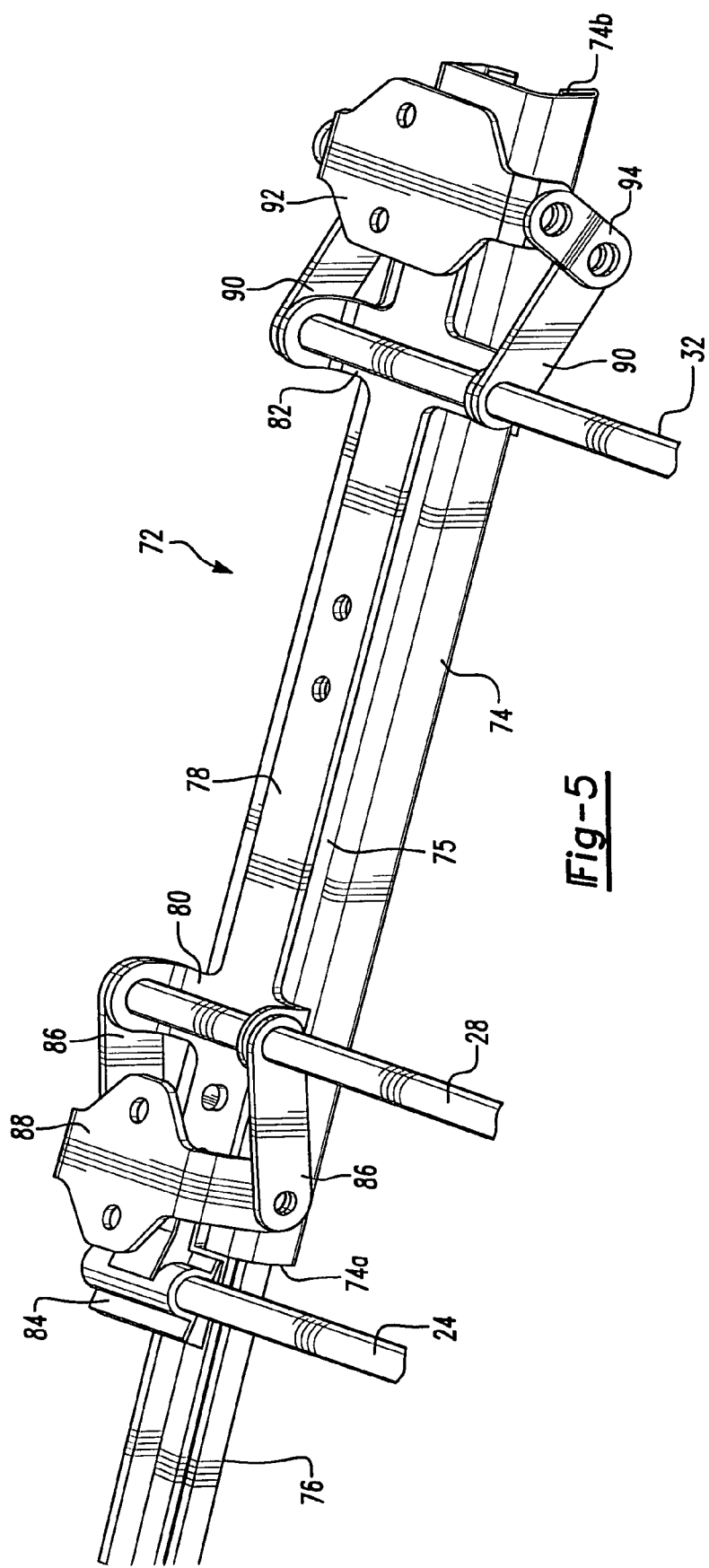
FIG. 5 is a perspective view of a seat track assembly having upper and lower tracks in which the transfer case assembly is mounted thereto.

Turning to FIG. 5, a seat track assembly is generally shown at 72, which receives each of the fore-aft 24, front lift 28 and rear lift 32 shafts. The seat track assembly 72 includes an upper track 74 slidably mounted to a lower track 76 by any suitable means known in the seat track art. The upper track 74 has a first end 74a, a second end 74b, and an upper surface 75 extending between the ends 74a, 74b. A mounting bracket 78, having a front bracket portion 80 and a rear bracket portion 82, is secured to the upper surface 75 of the upper track 74.

The fore-aft shaft 24 extending from the transfer case assembly 10 is received within a gearbox 84 for moving the seat track assembly 72 forward and rearward as will be discussed in greater detail below.

The front lift shaft 28 extending from the transfer case assembly 10 is rotatably supported in the front bracket portion 80. A pair of front arms 86 are non-rotatably secured to the front lift shaft 28 for rotation therewith. A front seat cushion mount 88 is rotatably connected to the front arms 86 in a spaced apart relationship to the shaft 28 and is secured to the front portion of the seat cushion. Rotation of the front lift shaft 28 in turn rotates the front arms 86 and moves the front seat cushion mount 88 upward and downward.

The rear lift shaft 32 extending from the transfer case assembly 10 is rotatably supported in the rear bracket portion 82. A pair of rear arms 90 are non-rotatably secured to the rear lift shaft 32 for rotation therewith. A rear seat cushion mount 92 is rotatably connected to the rear arms 90 in a spaced apart relationship to the shaft 32 and is secured to the rear portion of the seat cushion. Links 94 may also be provided between the rear arms 90 and the rear seat cushion mount 92 to provide additional height and adjustability. Rotation of the rear lift shaft 32 in turn rotates the rear arms 90 and moves the rear seat cushion mount 92 upward and downward. It should be appreciated that the rear seat cushion mount 92, rear arms 90 and rear bracket portion 82 are substantially mirror images of the front seat cushion mount 88, front arms 86 and front bracket portion 80.

In light of the above described interconnections, it should be appreciated that the transfer case assembly 10 moves in unison with the upper track 74.

Figure 6:
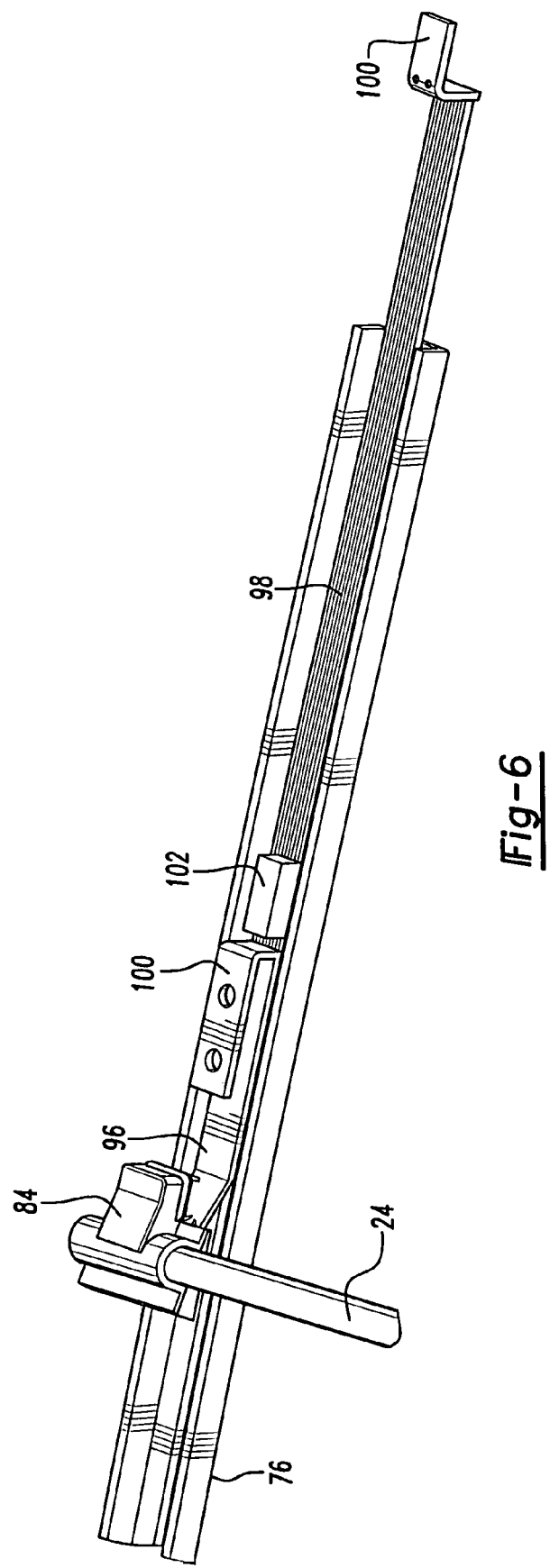
FIG. 6 is a perspective view of the lower track of the seat track assembly.

Turning to FIG. 6, the fore-aft shaft 24, gearbox 84 and associate parts are illustrated in greater detail. A short flexible shaft 96, which may be a hollow plastic or rubber sleeve, a cable, or the like, is disposed in the lower track 76. The gearbox 84 is of suitable construction for translating rotation of the fore-aft shaft 24 into rotation of the flexible shaft 96. Rotation of the fore-aft shaft 24 is therefore transmitted through the gearbox 84 to the short flexible shaft 96 to rotate the short flexible shaft 96 in unison with the fore-aft shaft 24. The short flexible shaft 96 extends from the gearbox 84 and is attached to a lead screw 98 having a plurality of threads. A pair of brackets 100 are non-rotatably supported on the lead screw 98. The brackets 100 are mounted to the upper track 74 such that the lead screw 98, short flexible shaft 96 and gearbox 84 move in unison with the upper track 74. The short flexible shaft 96 allows for any misalignment between the lead screw 98 and the gearbox 84. It should be appreciated that the flexible shaft 96 can be eliminated such that the lead screw 98 mounts directly to the gearbox 84.

A nut 102, having threads complementary to the threads of the lead screw 98, is fixedly mounted to the lower track 76 with the lead screw 98 passing therethrough. Rotation of the short flexible shaft 96 in turn rotates the lead screw 98 through the nut 102. The rotation of the lead screw 98 through the stationary nut 102 imparts the movement of the upper track 74, and the seat cushion, relative to the lower track 76.

To move the seat cushion in the foreword or rearward direction, the user actuates a control switch to a fore or aft position to energize the first solenoid 38. It should be appreciated that the control switch is electrically connected to the solenoid 38. Power is then applied to the motor 12 to rotate the drive shaft 14 and the first 16, second 18 and third 20 driving gears. Due to the continuous contact, the first 34, second 44 and third 58 driven gears also rotate. The first plunger 42 of the first solenoid 38 advances forward to push against the plate 40. The plate 40 in turn pushes against the first engagement ring 36. As the first plunger 42 advances both the plate 40 and the first engagement ring 36 move forward until the tabs 37 of the first engagement ring 36 engage the tabs 35 of the first driven gear 34. At this point, the first engagement ring 36 and the first driven gear 34 are in running engagement. Due to the non-rotatable engagement of the first engagement ring 36 with the fore-aft shaft 24, the rotational motion of the first driven gear 34 is now translated to the fore-aft shaft 24. The rotation of the fore-aft shaft 24 is transmitted to the gearbox 84, short flexible shaft 96 and lead screw 98.

The switch will typically have two or four possible positions which correlate to a desired movement, i.e., forward, rearward, up, or down. There may also be multiple switches controlling one or more of the movements. Depending upon the particular actuation of the switch, which controls a desired movement, the lead screw 98 will rotate either clockwise or counter-clockwise to move the seat cushion forward or rearward. Upon release of the control switch, the power to the motor 12 is cut, followed by the disengagement of the first plunger 42. The first return spring then biases the first engagement ring 36 out of coupling engagement with the first driven gear 34.

Movement of a front portion of the seat cushion up or down requires a similar initial input by the user, i.e., actuating a control switch electrically connected to the second solenoid 52 to energize the second solenoid 52. In turn, power is again applied to the motor 12 to rotate the drive shaft 14, the first 16, second 18 and third 20 driving gears and the corresponding first 34, second 44 and third 58 driven gears. The second plunger 54 moves forward and engages the abutment of the second engagement ring 48 to push the second engagement ring 48 forward. The tabs 47 of the second engagement ring 48 then engage the tabs 43 of the second driven gear 44 to rotate the front worm drive 46. The front worm drive 46 is now in running engagement with the front fan gear 56. The rotational movement of the front fan gear 56 rotates the front lift shaft 28. Depending upon the control of the switch which correlates to the desired movement, up or down, the front lift shaft 28 is rotated either clockwise or counter-clockwise to move the front arms 86 and front seat cushion mount 88 upward or downward. Upon disengagement of the control switch, the power to the motor 12 is cut, followed by the disengagement of the second plunger 54. The second return spring then biases the second engagement ring 48 out of coupling engagement with the second driven gear 44. As discussed above, the front fan gear 56 and front worm drive 46 lock the front portion of the seat cushion in the stated position.

Movement of a rear portion of the seat cushion up or down is substantially similar to the upward and downward movement of the front portion of the seat cushion. Initial input by the user, i.e., actuating a control switch, energizes the third solenoid 66. In turn, power is again applied to the motor 12 to rotate the drive shaft 14, the first 16, second 18 and third 20 driving gears and the corresponding first 34, second 44 and third 58 driven gears. The third plunger 68 moves forward and engages the abutment of the third engagement ring 62 to push the third engagement ring 62 forward. The tabs 63 of the third engagement ring 62 then engage the tabs 59 of the third driven gear 58 to rotate the rear worm drive 60. The rear worm drive 60 is now in running engagement with the rear fan gear 70. The rotational movement of the rear fan gear 70 rotates the rear lift shaft 32. Depending upon the desired movement, up or down, the rear lift shaft 32 is rotated either clockwise or counterclockwise to move the rear arms 90 and rear seat cushion mount 92 upward or downward. Upon disengagement of the control switch, the power to the motor 12 is cut, followed by the disengagement of the third plunger 68. The third return spring then biases the third engagement ring 62 out of coupling engagement with the third driven gear 58. As discussed above, the rear fan gear 70 and rear worm drive 60 lock the rear portion of the seat cushion in the stated position.

It should be appreciated that various control switches may be connected to the solenoids in various configurations such that the forward and rearward movement of the seat cushion as well as the upward and downward movement of the front and rear portions of the seat cushion may operate independently of each other or in concert with each other. The subject invention therefore creates a highly manipulatable seat cushion with the use of a single motor 12.

The invention has been described in an illustrative manner, it is to be understood that the terminology which has been used is intended to be in the nature of words of description rather than of limitation. It now apparent to those skilled in the art that many modifications and variations of the present invention are possible in light of the above teachings. It is, therefore, to be understood that the invention may be practiced otherwise than as specifically described.

What is claimed is:

1. A transfer case assembly for selectively moving a seat assembly in a plurality of adjustment directions, said assembly comprising:
   a motor;
   a drive shaft operatively connected to said motor for rotation in response to actuation of said motor;
   a plurality of driving gears mounted to said drive shaft for rotation therewith;
   a plurality of driven shafts corresponding with said respective plurality of driving gears for independently controlling movement of the seat assembly;
   a driven gear rotatably mounted to each of said driven shafts and meshed with a respective one of said driving gears for rotation therewith;
   a coupler disposed adjacent each of said driven gears for selectively coupling said driven gears to said respective driven shafts; and
   a power actuator disposed adjacent each of said coupler for operative engagement therewith for selectively coupling said driven gears with said respective driven shafts and transfer rotation of said drive shaft to rotation of said driven shafts through independent or simultaneous actuation of said actuators and said motor whereby the seat assembly may be moved in one or more of the plurality of adjustment directions.

2. The transfer case of claim 1 wherein said plurality of driving gears include teeth formed thereon for mating with said plurality of driven gears.

3. The transfer case of claim 1 wherein said plurality of driven gears include teeth formed thereon for mating with said plurality of driven gears.

4. The transfer case of claim 1 wherein said plurality of driven shafts comprise a fore-aft shaft, a front vertical shaft, and a rear vertical shaft.

5. The transfer case of claim 1 wherein said plurality of driving gears comprises first, second and third driving gears.

6. The transfer case of claim 1 wherein said plurality of driven gears comprise first, second and third driven gears.

7. The transfer case of claim 1 wherein said plurality of driven gears include tabs formed thereon for mating with said coupler.

8. The transfer case of claim 7 wherein said coupler comprises an engagement ring mounted about said driven shaft, said engagement ring moveable longitudinally along said driven shaft while remaining rotationally fixed relative to said driven shaft.

9. The transfer case of claim 8 wherein said engagement ring includes tabs formed thereon for mating with said driven gear.

10. The transfer case of claim 9 wherein said tabs formed on said engagement ring and said tabs formed on said driven gear cooperate to define a toothed clutch.

11. The transfer case of claim 1 wherein said coupler further includes a plate mounted about said driven shaft, said plate moveable longitudinally about said driven shaft while remaining rotationally fixed relative to said driven shaft.

12. The transfer case of claim 11 wherein said coupler further includes a solenoid having a plunger associated with said engagement ring for moving said engagement ring into engagement with said driven gear.

13. The transfer case of claim 11 wherein said coupler further includes a return spring disposed about said driven shaft between said engagement ring and plate for biasing said engagement ring out of engagement with said driven gear.

14. The transfer case of claim 1 further including a worm drive having a shaft section and a worm drive section.

15. The transfer case of claim 14 wherein said driven gear rotates about said shaft section of said worm drive.

16. The transfer case of claim 14 wherein said coupler comprises an engagement ring mounted about said shaft section, said engagement ring moveable longitudinally along said shaft section while remaining rotationally fixed relative to said shaft section.

17. The transfer case of claim 14 wherein said engagement ring further includes an appendage extending in a direction away from said driven gear.

18. The transfer case of claim 14 further including a solenoid having a plunger in contact with said appendage for moving said engagement ring into engagement with said driven gear.

19. The transfer case of claim 14 further including a return spring disposed about said shaft section of said worm drive between said engagement ring and said driven gear for biasing said engagement ring out of engagement with said driven gear.

20. The transfer case of claim 14 further including a fan gear mounted on at least one of said plurality of driven shafts, said fan gear engaging said worm drive.

21. The transfer case of claim 20 wherein said fan gear and said worm drive cooperate to define a self-locking configuration for preventing back driving of said driven shaft.

22. A transfer case assembly for selectively moving a seat assembly in a plurality of adjustment directions, said assembly comprising:

a motor;

a drive shaft operatively connected to said motor for rotation in response to actuation of said motor;

a plurality of driving gears mounted to said drive shaft for rotation therewith;

a plurality of driven shafts corresponding with said respective plurality of driving gears for independently controlling movement of the seat assembly;

a driven gear rotatably mounted to each of said driven shafts and meshed with a respective one of said driving gears for rotation therewith;

a coupler disposed adjacent each of said driven gears for selectively coupling said driven gears to said respective driven shafts, said coupler including an engagement ring mounted about said driven shaft, said engagement ring moveable longitudinally along said driven shaft while remaining rotationally fixed relative to said driven shaft; and a power actuator disposed adjacent each of said coupler for operative engagement therewith for selectively coupling said driven gears with said respective driven shafts and transfer rotation of said drive shaft to rotation of said driven shafts through independent or simultaneous actuation of said actuators and said motor whereby the seat assembly may be moved in one or more of the plurality of adjustment directions.

23. A transfer case assembly for selectively moving a seat assembly in a plurality of adjustment directions, said assembly comprising:

a motor;

a drive shaft operatively connected to said motor for rotation in response to actuation of said motor;

a plurality of driving gears mounted to said drive shaft for rotation therewith;

a plurality of driven shafts corresponding with said respective plurality of driving gears for independently controlling movement of the seat assembly;

a driven gear rotatably mounted to each of said driven shafts and meshed with a respective one of said driving gears for rotation therewith and wherein at least one of said driven gears includes a worm drive associated therewith;

a coupler disposed adjacent each of said driven gears for selectively coupling said driven gears to said respective driven shafts; and a power actuator disposed adjacent each of said coupler for operative engagement therewith for selectively coupling said driven gears with said respective driven shafts and transfer rotation of said drive shaft to rotation of said driven shafts through independent or simultaneous actuation of said actuators and said motor whereby the seat assembly may be moved in one or more of the plurality of adjustment directions.

* * * * *